April 14, 1970     K. F. HALL     3,505,757

TRAP FOR INSECTS SUCH AS FLIES

Filed July 19, 1967     2 Sheets-Sheet 1

INVENTOR.
KENNETH F. HALL
BY
ATTORNEYS

April 14, 1970      K. F. HALL      3,505,757

TRAP FOR INSECTS SUCH AS FLIES

Filed July 19, 1967      2 Sheets-Sheet 2

INVENTOR.
KENNETH F. HALL
BY
*Mathew y Edwards*
ATTORNEYS

United States Patent Office 3,505,757
Patented Apr. 14, 1970

3,505,757
TRAP FOR INSECTS SUCH AS FLIES
Kenneth F. Hall, 9205 W. 73rd Place,
Arvada, Colo. 80002
Filed July 19, 1967, Ser. No. 654,654
Int. Cl. A01m 1/10
U.S. Cl. 43—118
9 Claims

ABSTRACT OF THE DISCLOSURE

A trap for insects such as flies having upright inner and outer enclosures defining an insect confining chamber therebetween and arranged for placement of an open bottom portion of the inner enclosure in overhanging relation to a bait which attracts the insects. Intercepting surface portions within the inner enclosure define an upwardly inclined crawl surface for directing insects in an upward movement from the bait and restricted openings along at least one side wall and at the top of the inner enclosure through which the insects may pass in their upward movement. A detachable arrangement associated with the inner enclosure to remove the insects without contacting same.

---

My invention relates to trapping devices and particularly traps for insects such as flies which are attracted to and lay their eggs on fecal or other contaminated material.

The undesirability of insects such as flies in habitable areas is well known. Common attractions for flies for feeding and the deposit of eggs around the house are food deposits frequently found around patios and garbage cans. and manure deposits frequently found around barns and stables. Dog manure in yards in urban areas is also a common attraction for flies. Traps have been utilized in the past to kill flies. More recently, poison baits and the spraying of poisons have been used, but have not been entirely satisfactory for all applications. With the use of poison bait or sprays in safe concentration there is the danger of accidental usage by persons or animals and in many instances the flies are not attracted thereto. Poison sprays frequently result in fly immunity or resistance thereto and they are usually ineffective a short time after the spraying application.

Accordingly, it is an object of this invention to provide a trap for insects such as flies which is simple, efficient, easy to handle, and easily stored when not in use.

Another object of this invention is to provide a novel trap for insects which is particularly effective in trapping and killing various types of insects including house flies.

A further object of this invention is to provide a trap for flies and similar insects in which the flies are easily killed and disposed of without requiring a poison and without contact by the user.

Other objects, advantages and capabilities of the present invention will become apparent as the following description proceeds taken in conjunction with the accompanying drawings in which.

Figure 1:
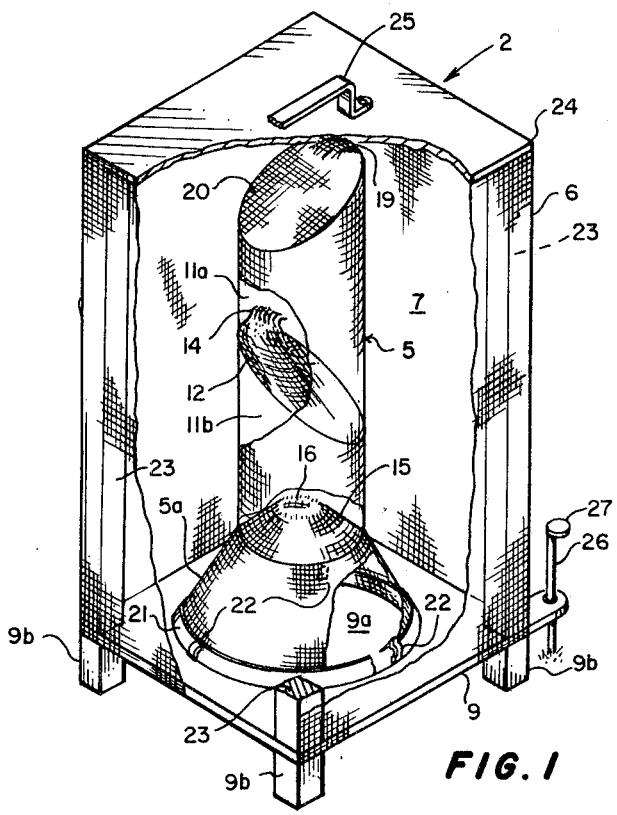
FIG. 1 is a perspective view of an insect trap embodying my invention with wall portions broken away to show interior parts.
Figures 6, 7, 8:
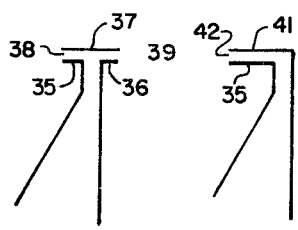
Figure 9:
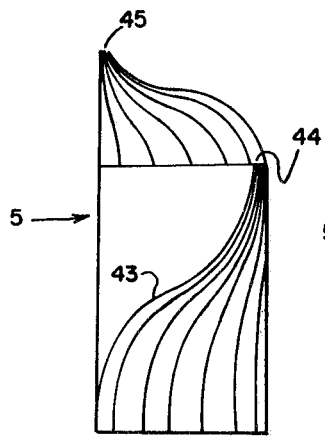
Figure 11:
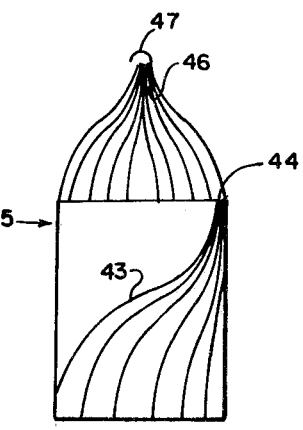
Figure 10:
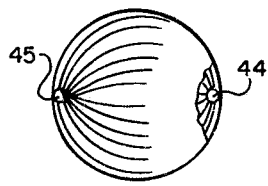
Figure 12:
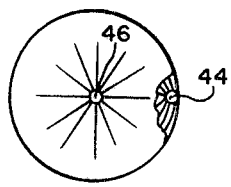
Figure 13:
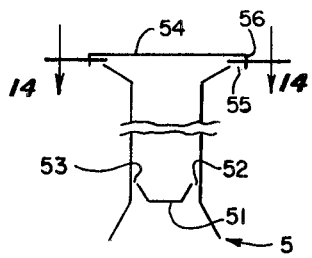
Figure 14:
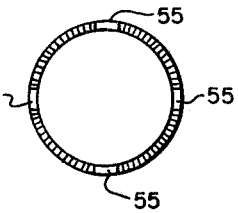
Figure 15:
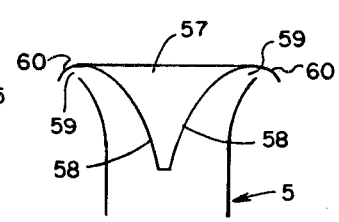
Figure 16:
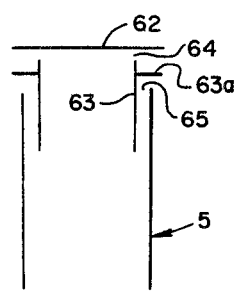
Figure 17:
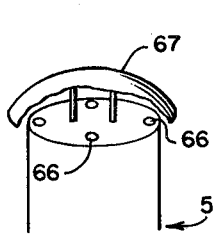

FIG. 6 is a schematic elevation view of an alternative form of upper portion of the inner enclosure member defining the top of opening particularly suitable for a device as shown in FIG. 1 and as in the remainder of the FIGS. 7–17 the wall portions are indicated by a single line rather than the preferred screen-like material with depth or a third dimension as shown in FIG. 1 to avoid unnecessary drawing duplication;

FIG. 7 is a schematic elevation view of another form of upper portion of inner enclosure member defining the top opening;

FIG. 8 is a schematic elevation view of yet another form of upper portion of the inner enclosure member;

FIG. 9 is a schematic elevation view of an alternative form of partition arrangement for the inner enclosure member embodying features of my invention using generally ellipsoid shaping;

FIG. 10 is a schematic top plan view of the inner enclosure member of FIG. 9 with a portion of the top wall or partition member broken away to show the position of the restricted opening adjoining one upright wall portion thereof;

FIG. 11 is a schematic elevation view of an alternative form of partition arrangement for the inner enclosure member;

FIG. 12 is a schematic top plan view of the inner enclosure member shown in FIG. 11 with a portion of the top or upper wall broken away to show the position of the interior restricted opening;

FIG. 13 is a schematic elevation view of another form of inner enclosure member embodying my invention;

FIG. 14 is a sectional view taken along lines 14—14 of FIG. 13 shown schematically another form of restricted top openings;

FIG. 15 is a schematic side elevation view of another form of top closure portion for the inner enclosure member embodying features of my invention;

FIG. 16 is a schematic side elevation view of another form of top enclosure portion for the inner enclosure member; and FIG. 17 is a schematic side elevation view of a yet another form of top enclosure portion for the inner enclosure member.

Figure 2:
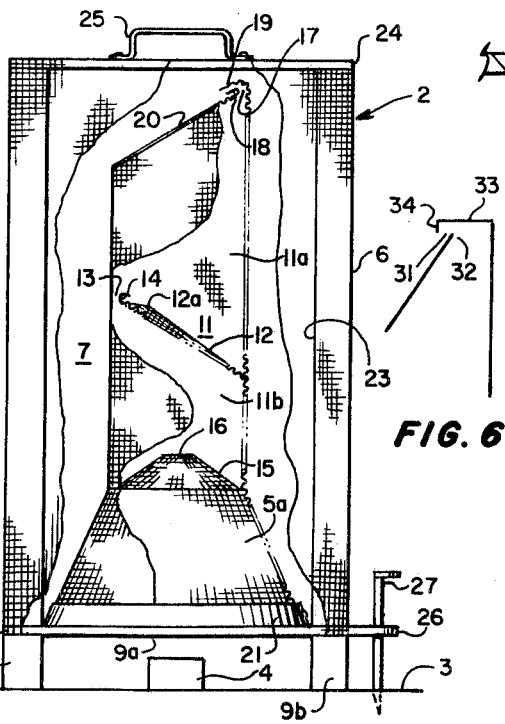
FIG. 2 is a side elevation view of the insect trap shown in FIG. 1 with wall portions broken away to show interior parts.

Referring now to the drawings in FIGS. 1 and 2, there is shown a trap 2 supported in an upright position on a flat surface 3 such as the ground with its lower portion disposed in overhanging relation to a bait 4. This bait 4 may consist of that produced commercially or any decaying matter. Manure from household pets especially dogs attracts large numbers of flies. This trap generally includes an inner enclosure member 5 and an outer enclosure member 6 surrounding the inner enclosure member and defining therebetween an insect confining chamber 7. These enclosure members are mounted in an upright position on a common generally flat base 9 which has a central opening 9a and depending leg portions 9b which dispose its central opening and an adjoining and coextensive bottom opening of the inner enclosure member in spaced overhanging relation to the bait 4 and permit access to the bait by insects under the flat portion of the base. Briefly stated, in this trap 2 insects are attracted to the bait 4 and upon leaving the bait fly upwardly into and are first confined within and then progress upwardly through the inner enclosure member 5. Finally, they pass from the inner enclosure member into the confining chamber 7 where they are trapped and preferably die from starvation (flies die of starvation) therefore once they are in the trap no additional attention is necessary.

More specifically, as shown, the inner enclosure member 5 has elongated generally cylindrical side wall portions with a flared or frusto-conical shaped lower portion 5a which define a first or initial insect confining passage or chamber 11. The movement of the insect upwardly through the first confining chamber 11 is directed or induced by a series of partition members or insect intercepting surfaces traversing the side wall portions at a substantial angle of inclination terminating at their upper ends in restricted openings along which the insects will first pass in an upward crawling or climbing movement and pass through such restricted openings without being capable of retracing their movement through the restricted openings so as to escape.

In the form of FIGS. 1 and 2 a centrally disposed partition or insect intercepting member 12 is provided which extends from one side wall at a substantial angle of inclination to the opposing side wall so as to divide the insect confining chamber 11 into upper and lower portions 11a and 11b. A portion of the upper end of the partition member terminates in spaced relation with said opposing side wall so as to define with the side wall a restricted opening 13 through which insects will pass after progressing by climbing or crawling in their upward movement usually along the undersurface of this partition member 12.

Figure 3:
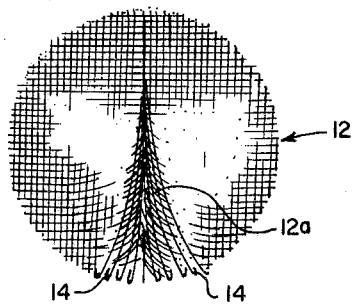
FIG. 3 is a top plan view of insect intercepting members providing inclined crawl surface portions in the inner enclosure shown in FIG. 1 drawn to an enlarged scale.
Figure 4:
FIG. 4 is an end elevation view of the intercepting member shown in FIG. 1 as viewed looking toward the restricted opening.

A preferred form of construction for this partition member is shown in the views of FIGS. 3 and 4 drawn to an enlarged scale wherein it is generally circular in shape so as to engage the side wall portions throughout its lengthwise extent except when it forms restricted opening 13 and fully divide the chamber 11 and is formed of a foraminous or screen-like material. This partition member 12 is shaped to include an upstanding or curvilinear portion 12a on the undersurface thereof which progressively increases radially thereof toward the upper restricted opening 13 for directing movement of the insect. A few strands 14 of the screen material are turned or folded back at the upper end adjoining the restricted opening so as to prevent and discourage return travel by crawling of the insect.

Below and in spaced relation to the partition member 12 there is provided a frusto-conical shaped collar or baffle-like member 15 having circumferentially disposed surface portions upwardly extending from the side wall which terminates in a central opening 16 of a lesser diameter than the bottom opening of the inner enclosure member. The inner surface of the lower portion of the inner enclosure member and the under surfaces of the baffle-like member provide upwardly inclined crawl or climbing surfaces for insects after they initially fly from the bait for directing the flies upwardly toward the undersurface of the partition member 12. The central opening 16 is of a substantially larger diameter than the restricted opening 13 so that the insects will move quickly by climbing or flying into the lower portion of the chamber above the baffle-like member 15 with the upper surface portions of this member engaging and projecting outwardly from the side wall portions of the inner enclosure member so as to prevent their falling from the chamber. The baffle-like member is preferably of a foraminous or screen-like material.

Above and in spaced relation to the partition member 12 there is provided a top or upper inclined wall member 20 which extends from one side wall and above the restricted opening to the opposing side wall portion with an upper end portion thereof terminating in spaced relation with the side wall to form a top opening 17 in the inner enclosure member through which insects will pass after progressively climbing or crawling in their upward movement usually along the undersurface of this upper member. A preferred construction of this upper member is the same as the partition member 12 shown in FIGS. 3 and 4 and is oppositely inclined therefrom having its lower end above and in spaced relation with the restricted opening 13 with a few strands 18 folded back over its upper surface and the upper end above the opposite closed end of the partition member 13. In this manner insects falling from the inclined undersurface of the upper member 20 are maintained within the upper portion 11a of the insect confining chamber.

An overhanging portion 19 for the top opening is provided by extending the side wall over the top opening 17 and overhanging strands 18 in spaced relation along the top surface of the upper member a short distance. In this arrangement the insects after passing through the top opening 17 into the trap chamber 7 will tend to crawl along the upper surface and hop up onto the overhanging portion rather than crawl downwardly through the top opening. Further, the strands 18 of the upper member similar to those described with respect to the partition member tend to inhibit the insects from returning downwardly through the top opening 17.

Figure 5:
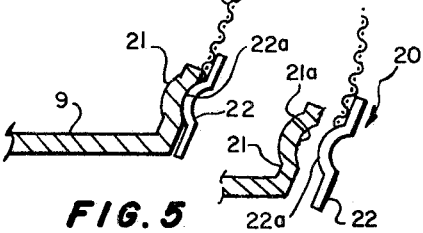
FIG. 5 is a fragmentary view showing one of the plurality of fastening members disposed between the inner enclosure member and base of the trap shown in FIG. 1 and drawn to an enlarged scale.

A preferred manner of mounting the inner enclosure member 5 on the base 9 is shown in FIGS. 1, 2 and 5 which permit the removal of the inner enclosure member through the opening in the base for easily discharging the dead insects from the trap. This arrangement includes the provision of an upstanding inwardly inclined flange portion 21 on the base 9 which encloses the lower end portion of the inner enclosure member in close fitting relation thereto having an internal recess portion 21a formed therein. A plurality (3 shown) of circumferentially spaced clip members 22 are mounted in a depending manner on the lower end portion 5a of the inner enclosure member and include outwardly projecting surface portions 22a which when this member is positioned in place as shown forms a friction coupling by bearing outwardly against the associated recess portions 21a. To remove the inner enclosure member then requires the application of inward forces against these clip members 22 to a position 20 shown in dash lines at 20 which releases the coupling so as to permit withdrawal of this member 5 from member 6 to remove dead insects which have been trapped within the chamber. Replacement for operation then merely requires a reinsertion of member 5 into member 6 to the position as shown.

The outer enclosure member 6 may be of various shapes such as cylindrical, oblong, conical as may be the shaping of the inner enclosure member 5 so as to define with the inner enclosure member the closed insect confining chamber 7 which will contain a substantial number of insects. In the oblong form shown there is provided at each corner an upstanding support member 23 having a cover of material preferably screen wrapped around these support members 23 to form the side wall portions. In a preferred construction the support members would be metal rods, bars or strips of lesser section than that illustrated. This construction covered with a foraminous or screen-like material provides an assembly in which the trapped flies will produce a noise which will attract other flies to the trap. A top closure number 24 closes the top and is provided with a suitable handle 25 for grasping to permit transport to a selected location. An anchor member 26 comprising a strap having an aperture in the end portion projects laterally of the outer member which is adapted to receive a stake 27 which extends through the aperture and into the ground to anchor the trap at a selected position and prevent its being turned on one side which would render the trap ineffective.

While the flat base as shown is suitable for disposing the trap on a flat surface such as on the ground in overhanging relation to a bait it is understood that other forms of bases or mounting means may be provided for mounting this trap above the open end of the garbage can or the like. Preferably, the bait will be disposed at a location away from the house or similar habitable area to keep flies from these areas.

Referring now to the schematic drawings of FIGS. 6, 7 and 8, it should be appreciated that the third dimension of the remaining views has not been shown for purposes of clarity but in each instance the shaping is cylindrical, oblong, conical or similar three dimensional configurations with the spaced portions which form openings being suitably held by intermediate support structure. There is represented in FIG. 6 a top opening 31 for the inner enclosure member which is formed by the upper end 32 of the upper wall member and an extended portion 33 of the opposite side wall projecting generally horizontally with a depending end portion 34 disposed outwardly of the upper end of the upper wall member. In FIG. 7 the upper ends of the upper wall member and the side wall each have outwardly projecting flanged portions 35 and 36, respectively, with a top member 37 disposed above these flange portions so as to define two opposing top openings 38 and 39. The extended portion of the upper wall member is similar in FIG. 8 to that shown in FIG. 7 but the extended portion 41 of the side wall extends above and in overhanging relation thereto so as to form a single horizontal insect restricted passage and opening 42.

The inner enclosure members represented schmatically in FIGS. 9–12 each show an alternative form of lower partition member designated 43 of curvilinear or sinuous shaped configuration and preferably of the shape of an ellipsoid which forms at its upper end at the opposing side wall a restricted opening 44 shown as a small circular opening through which the insect may pass. The top wall or upper partition member of the form shown in FIGS. 9 and 10 has its lower portion extending upwardly from above the restricted opening 44 to terminate at its upper end in a top opening 45 adjoining the upright side wall oppositely of restricted opening 44 and is also preferably generally of a curvilinear or sinuous shaped configuration and preferably of the shape of an ellipsoid. The top wall or upper partition member of the form shown in FIGS. 11 and 12 is generally conical and terminates at its apex portion in a top opening 46 disposed centrally of the side walls with one extended portion 47 overhanging the top opening 46.

In the form of inner enclosure member shown schematically in FIGS. 13 and 14 there is provided an alternative form of baffle-like member 51 disposed centrally of the chamber and having upwardly inclined undersurface portions extending outwardly and terminating in spaced relation with the side wall portions to form restricted openings 52 and 53 on each side of the enclosure member. Another shaping for this member would be V-shaped similarly disposed. The upper end portions of the side walls of this enclosure member are inclined outwardly and are disposed in spaced relation. The top closure member 54 for this embodiment is formed by the outwardly inclined upper end portions of the side walls and a flat top cover 54 supported in spaced relation thereto with adjoining portions filled in so to form circumferentially extending top openings 55 as shown in FIG. 14. Top cover 54 may be provided with depending end portions 56 at the periphery of the top member as shown to inhibit return of the insects through the restricted openings 55.

An alternative form of top cover member 57 is shown in FIG. 15 wherein it has oppositely disposed inclined surface portions 58 projecting downwardly into the top and in spaced relation to the side walls of the inner enclosure member for providing upwardly inclined crawl surfaces along the top closure member for directing the insects through the top openings 59 formed with the side upper ends of the walls. These side walls may be essentially upright or inclined outwardly to conform to the shaping of the inclined surface portions 58 as shown. Preferably the top cover 57 will include depending end portions 60 to inhibit return of the insects through the restricted openings.

In the arrangement of FIG. 16 there is provided between a flat top cover 62 an intermediate member 63 having lower end portions disposed in the top and in spaced relation to the side walls of the inner enclosure member which has upper end portions terminating in spaced relation to the top cover 62 to define upper restricted openings 64 and lower restricted openings 65 at its lower end. This intermediate member is provided with a flanged portion 63a which projects outwardly to overhang the upper end of the side wall in forming a portion of the upper restricted openings.

A final alternative for a top wall for the trap of the type shown in FIGS. 1 and 2 is shown in FIG. 17 wherein the upper end of the inner enclosure member is essentially closed and provided with a plurality of apertures therein. A shield or cover member 67 is then disposed over the upper end and apertures in spaced overhanging relation to inhibit insect return through these openings.

From the foregoing description of the various features of my invention it should be apparent that there is provided numerous capabilities for fly control and many advantages over poison bait and poison sprays currently in use. Traps embodying features of my invention may be constructed of a durable material such as screen and metal and have no moving parts or wear surfaces and do not require time consuming manipulation. A single trap may therefore provide years of service with a minimum of maintenance.

Of particular value with such a trap of the type herein described is that the majority of flies are caught after laying their eggs on fecal or contaminated material. In this manner they are prevented from contaminating food and/or people. The bait may be placed away from the house thus being of further value in eliminating flies from the house and contact with humans and food. Flies once in the trap also attract other flies to the vicinity of the trap and bait by the noise they make. Further, this trap will catch egg laying flies early in the season thus reducing concentration in a given area since flies spend their entire life within a few hundred feet of where they are born.

Although specific embodiments of my invention have been illustrated, various modifications may occur to those skilled in the art. Therefore, I do not desire my invention be limited to the specific details illustrated and described.

I claim:

1. A trap for insects adapted for placement at selected locations with a lower portion disposed over a bait comprising inner enclosure means having substantially upright side wall portions and an opening in the lower portion through which insects may pass upon upward movement from the bait so as to be confined within the inner enclosure means in said movement, intercepting means in said inner enclosure means defining a crawl surface having at least a portion inclined upwardly in said enclosure means and terminating in spaced relation with a side wall portion to define a restricted opening through which insects may pass in their upward movement, outer enclosure means disposed in enclosing relation about said inner enclosure means and forming therewith an insect confining chamber and a base having portions for supporting said inner and outer enclosure means in an upright position above a bait and closing the lower portion of said chamber, said base having an opening in communication with the lower opening in said inner enclosure means, and means for detachably connecting the lower portion of said inner enclosure means with said base to permit its removal and replacement through the opening in said base for removal of the insects trapped in said chamber.

2. A trap for insects as set forth in claim 1 wherein said intercepting means is generally ellipsoidal in shaping.

3. A trap for insects as set forth in claim 1 wherein said inner enclosure means includes a baffle member below said intercepting means having upwardly inclined surface portions terminating in spaced relation with the side wall portions to define therewith restricted openings for upward passage by the insects.

4. A trap for insects as set forth in claim 1 wherein said inner enclosure means includes top wall portion having inclined surface portions defining a second crawl surface extending upwardly above the restricted opening of the intercepting means and terminating in spaced relation with an opposing wall surface to define a top opening in the inner enclosure means through which insects may pass.

5. A trap for insects as set forth in claim 1 wherein said intercepting means is of a screen-like material having a plurality of spaced strands folded back over its upper surface adjoining said restricted opening to inhibit return movement of said insect.

6. A trap for insects adapted for placement at selected locations with a lower portion disposed over a bait comprising inner enclosure means having substantially upright side wall portions and an opening in the lower portion through which insects will pass upon upward travel from the bait so as to be contained within wall portions of the inner enclosure means in said movement, said inner enclosure means having a top closure having an upwardly directed crawl surface within the enclosure means including portions terminating in spaced relation with the upper terminal end of the side wall portion to define therewith a restricted opening through which insects may crawl in their upward movement to pass from said inner enclosure means, and outer enclosure means disposed in enclosing relation about said inner enclosure means and forming therewith a closed insect confining chamber into which the insects crawl after passing from the inner enclosure means to be trapped.

7. A trap for insects as set forth in claim 6 wherein said top closure includes opposing inclined crawl surfaces extending upwardly and outwardly from a central portion of the enclosure means in spaced relation with opposing upper end wall portions of said inner enclosure means to define a generally annular crawl passage.

8. A trap as set forth in claim 7 wherein said top closure includes outwardly extended portions disposed in overhanging relation with the associated restricted openings.

9. A trap for insects as set forth in claim 6 inclusive of an intermediate member disposed between the top closure wall and the upper end portions of the side wall to form upper and lower restricted openings therebetween.

References Cited

UNITED STATES PATENTS

| | | | |
|---|---|---|---|
| 1,102,141 | 6/1914 | Cooley | 43—118 |
| 1,178,076 | 4/1916 | Jefferis | 43—118 |
| 1,313,837 | 8/1919 | Schrantz | 43—118 |
| 1,496,135 | 6/1924 | Schwiening | 43—118 |
| 1,543,228 | 6/1925 | Morrow | 43—118 |
| 1,762,668 | 6/1930 | Schandua et al. | 43—118 |
| 2,137,582 | 11/1938 | Novak | 43—118 |
| 2,190,251 | 2/1940 | Brandt | 43—118 |
| 2,429,377 | 10/1947 | Stevens | 43—118 |
| 2,786,298 | 3/1957 | Smith | 43—118 |
| 3,340,646 | 9/1967 | Jadick | 43—118 |

ALDRICH F. MEDBERY, Primary Examiner